(12) United States Patent
Aeby et al.

(10) Patent No.: US 12,280,552 B2
(45) Date of Patent: Apr. 22, 2025

(54) CONNECTOR ELEMENT AND METHOD OF BONDING SUCH CONNECTOR ELEMENT TO A SUBSTRATE

(71) Applicant: MULTIMATERIAL-WELDING AG, Biel (CH)

(72) Inventors: Cyrille Aeby, Billens (CH); Stéphane Audriaz, Bern (CH)

(73) Assignee: MULTIMATERIAL-WELDING AG, Biel (CH)

( * ) Notice: Subject to any disclaimer, the term of this patent is extended or adjusted under 35 U.S.C. 154(b) by 0 days.

(21) Appl. No.: 18/296,619

(22) Filed: Apr. 6, 2023

(65) Prior Publication Data
US 2023/0241844 A1   Aug. 3, 2023

Related U.S. Application Data

(63) Continuation of application No. PCT/EP2022/068256, filed on Jul. 1, 2022.

(30) Foreign Application Priority Data

Jul. 2, 2021   (CH) ................................ 070009/2021

(51) Int. Cl.
*B29C 65/00* (2006.01)
*F16B 37/06* (2006.01)

(52) U.S. Cl.
CPC .... *B29C 66/30221* (2013.01); *B29C 66/7392* (2013.01); *B29C 66/8322* (2013.01); *F16B 37/061* (2013.01)

(58) Field of Classification Search
CPC ............. F16B 37/061; B29C 66/30221; B29C 66/7392; B29C 66/8322; B29C 66/30223; B29C 65/08; B29C 66/474

(Continued)

(56) References Cited

U.S. PATENT DOCUMENTS 7,765,672 B2 * 8/2010 Clinch ...................... F16B 5/01
29/520
8,151,541 B2 * 4/2012 Aeschlimann .... B29C 66/82261
52/704
(Continued)

FOREIGN PATENT DOCUMENTS

WO         00/79137 A1   12/2000
WO      2018/172385 A1    9/2018

OTHER PUBLICATIONS

Written Opinion and International Search Report issued Nov. 22, 2022 in Intl Appl. No. PCT/EP2022/068256.

*Primary Examiner* — Flemming Saether
(74) *Attorney, Agent, or Firm* — MEDLER FERRO WOODHOUSE & MILLS PLLC

(57) ABSTRACT

A connector element is disclosed for being bonded to a substrate by pressing the connector element and the substrate together and mechanically exciting the connector element and the substrate relative to each other when being pressed together. The connector element includes a base portion having a distal surface and plural protrusions distally extending from the distal surface of the base portion. The protrusions are formed of a thermoplastic material configured to liquefy when the connector element is pressed to the substrate and mechanically excited. Link members are formed of a thermoplastic material configured to liquefy when the connector element is pressed to the substrate and mechanically excited. Each link member connects two neighboring protrusions of the protrusions.

34 Claims, 5 Drawing Sheets

(58) Field of Classification Search
USPC .................................................. 411/171, 82
See application file for complete search history.

(56) References Cited

U.S. PATENT DOCUMENTS

| | | | |
|---|---|---|---|
| 10,562,233 B2 * | 2/2020 | Mayer | B29C 65/06 |
| 10,668,668 B2 | 6/2020 | Mayer et al. | |
| 11,084,226 B2 * | 8/2021 | Poschner | B32B 37/146 |
| 11,325,318 B2 * | 5/2022 | Mayer | B29C 66/7392 |
| 11,472,124 B2 * | 10/2022 | Mayer | B29C 66/7392 |
| 2006/0033091 A1 * | 2/2006 | Fattori | B29C 66/1142 |
| | | | 256/19 |
| 2008/0199249 A1 | 8/2008 | Clinch et al. | |
| 2021/0122121 A1 * | 4/2021 | Lehmann | F16B 37/048 |
| 2022/0136554 A1 * | 5/2022 | Eckhard | B29C 66/9513 |
| | | | 411/171 |
| 2023/0250840 A1 * | 8/2023 | Torriani | B29C 65/5057 |
| | | | 403/28 |

\* cited by examiner

CONNECTOR ELEMENT AND METHOD OF BONDING SUCH CONNECTOR ELEMENT TO A SUBSTRATE

CROSS-REFERENCE TO RELATED APPLICATIONS

The present application is a continuation of prior application PCT/EP2022/068256 filed Jul. 1, 2022, which claims priority to CH 070009/2021, filed Jul. 2, 2021, each of which is incorporated by reference herein in its entirety.

TECHNICAL FIELD

The present invention relates to a connector element and to a method for bonding such connector element into a compressible substrate.

More particularly the invention relates to a connector element for being bonded to a substrate by pressing the connector element and the substrate together and mechanically exciting the connector element and the substrate relative to each other when being pressed together, wherein the connector element comprises a base portion having a distal surface and a plurality of protrusions distally extending from the distal surface of the base portion and wherein the plurality of protrusions comprise a thermoplastic material configured to liquefy when the connector element is pressed to the substrate and mechanically excited. Further, the invention relates to a method of bonding such a connector element. Such connector elements and method can be used in the field of mechanical engineering in a variety of industries such as for instance construction industries and automotive industries as well as for a wide range of different substrate materials such as compressible lightweight materials.

BACKGROUND

The bonding of connectors in lightweight materials such as hollow core boards made of different types of material (e.g. wood-based materials, plastic materials such as e.g. Polypropylen), sandwich materials made of different types of material (e.g. wood-based materials, plastic materials such as e.g. Polypropylen), and especially of foam materials like e.g Expanded Polypropylen or Polyurethan, metal foams, and different types of thermoplastic or other plastic materials, that are or are not reinforced with fillers like carbon and/or glass fibres as well as fibrous materials and woven materials is becoming more and more relevant in industries like automotive, aviation and construction in general. Traditional methods like gluing, screwing, nailing, riveting and the like pose challenges in relation to the production speed, quality and weight of the parts. Gluing is very time consuming since the glue needs to dry and quality of the bond is difficult to control. Depending on the density of the substrate material the bonding of classic mechanical connectors like screws, nails and rivets may damage the substrate material and lead to very low bonding strengths.

In WO 2018/172385 A1 a method of bonding two objects together is disclosed wherein the first object is a connector made of thermoplastic material comprising a plurality of tips distally protruding and the second object comprises a region with low density. During the bonding process thermoplastic material of the first object is liquefied by the application of ultrasound and the first object is being pressed to the second object in order to change the compression strength in the region of low density, which facilitates the liquefaction of the thermoplastic material of the first object.

In connection with such bonding objects together by liquefying the object with tips or protrusions, it may be challenging to provide sufficient robustness in the tips and at the same time achieving sufficient penetration into the other object. Particularly, when comparable high pressures are involved, the tips should be designed on the one hand comparably thick or voluminous for being sufficiently solid and on the other hand comparably thin or lean for being capable of penetrating the other object.

Thus, there is a need for a connector element that provides for stability during the bonding process and for an enhanced bonding result by preventing collapse of protrusions during the bonding process.

SUMMARY

According to the invention this need is settled by a connector element, and a method of bonding such a connector element to a compressible substrate having a proximal surface as described herein, with preferred embodiments also being described herein.

In one aspect, the invention is a connector element for being bonded to a substrate by pressing the connector element and the substrate together and mechanically exciting the connector element and the substrate relative to each other when being pressed together. The substrate can particularly be a lightweight material such as a thermoplastic material and, more specifically, a foamed plastic material. For example, the substrate can be made of or comprise expanded polypropylene (EPP), expanded polyethylene (PE), expanded polyvinylchloride (PVC), expanded polystyrene (EPS), extruded polystyrene (XPS), expanded polylactic acid (PLA), or other PE-, PVC- or PLA-containing foams. Another example of a substrate is a hollow core board or a sandwich material at least partially made of thermoplastic materials like PP, PE, PVC, PLA, extruded Polypropylene (XPP), Polyamide (PA), Polyethylene terephthalate (PET), Polyphenylene ether (PPE), or blends particularly of the thermoplastic materials listed before.

The connector element comprises a base portion having a distal surface, and a plurality of protrusions distally extending from the distal surface of the base portion. The protrusions comprise a thermoplastic material configured to liquefy when the connector element is pressed to the substrate and mechanically excited. Further, the connector element comprises link members comprising a thermoplastic material configured to liquefy when the connector element is pressed to the substrate and mechanically excited. Each link member connects at least two neighboring protrusions of the protrusions.

The term "connector element" in the context of the invention relates to a structure being connectable to the substrate. It can be a connector capable of being pressed via a tool to the substrate and to be mechanically exited by the same or a different or an additional tool as the connector element is pressed to the substrate and thereby being partially liquefied in order to bond to the substrate via a positive fit connection and/or an integral bond such as a weld. The connector element may be bond to the substrate in order to reinforce the substrate material or in order to connect an object to the substrate. In the case of reinforcement of the substrate, the connector element may provide for a different connecting element to be attached, fastened or bonded to the connector element. These connecting elements may be a female connection element such as a channel or hole for screw mounting. The connector element may enhance the screw connection. In the case of the connection of an object to the substrate, the connector element can be used to attach, fasten or bond the second object to the substrate by enveloping the respective object or by piercing through the object or by being welded to the object in a further process step. The connector element may be equipped with a male connecting structure in order to mount the object, e.g., by clipping of the like.

The base portion of the connector element can be cylindrical of disk-like shaped. It can have a rotationally symmetric as well as rotationally asymmetric cross section like. For instance, the cross section can be round, square, rectangular, polygonal, triangular or not defined in geometry, meaning an individually shaped cross section. The connector element may also be of a conical form.

The base portion according to embodiments of the invention comprises a proximal and a distal side forming a proximal surface and the distal surface arranged along an axis, i.e., a proximodistal axis.

The term "distal" relates to a direction towards the substrate in the intended application or use of the connector element. It may relate to the direction in a narrow sense as well as to a relative position. For example, the distal surface of the base portion is the section of the base portion oriented towards the substrate while being bonded to the substrate. Likewise, the term "proximal" relates to a direction or relative position opposite to distal.

In embodiments, the purpose of the distal surface is to being bond in or to or onto the substrate whereas the purpose of the proximal surface may be to either provide connecting elements such as a female or male part of a connection or to function as attachment surface or proximal coupling structure for the tool that presses the connector element and the substrate together and mechanically excites them. The base portion may comprise a flat portion that is not equipped with protrusion or any other structures protruding in a distal direction. In embodiments the tool, to which the connector element is suited, is a sonotrode. In other embodiments the tool can be an automatic screwdriver or wrench (automated). In an embodiment the base portion consists of or at least comprises thermoplastic material.

The distal surface of the base portion comprises the plurality of distally extending protrusions. The protrusions comprise the thermoplastic material that is configured to liquefy when the connector element is pressed to the substrate and is mechanically excited, e.g., by a tool such as a sonotrode. For a particularly strong connection, the protrusions can be configured to penetrate the substrate in the bonding process. For achieving this, they may comprise a tip end, edge or other cutting end. Like this, a strong anchoring of the connector into the substrate can be achieved.

Thermoplastic material in the context of the invention may be a material or at least a component of a material that is capable of being molten, made flowable or liquefied by mechanical excitation and simultaneous interaction with the substrate. For example, the thermoplastic material can be configured to liquefy when the connector element is pressed to the substrate and vibrated, rotated and/or oscillated. Like this, pressure and friction forces may generate sufficient heat to at least locally or partially liquefy the thermoplastic material. Thus, the liquefying interaction between connector element and substrate is usually friction caused by mechanical excitation of the connector element such as by mechanical vibration or rotation heating up the thermoplastic material. As a result, the thermoplastic material softens, melts or gets flowable. In embodiments of the invention a precondition for the herein described process is the exposure of the connector element and the substrate to pressure. This pressure can be established by a tool that presses the connecting element in or to or onto the substrate, the substrate exercising a certain counter pressure thereto. In embodiments the substrate can be pressed by a tool to the connector element like for instance via lateral clamping or similar. In order to build up friction a certain press fit kind of condition needs to be established.

A thermoplastic material suitable for the method according to the invention is solid at room temperature or at a temperature at which the bonding process is carried out. It preferably comprises a polymeric phase (especially C, P, S or Si chain based) that transforms from solid into liquid or flowable above a critical temperature, for example by melting, and re-transforms into a solid material when again cooled below the critical temperature, for example by crystallization, whereby the viscosity of the solid phase is several orders of magnitude (at least three orders of magnitude) higher than of the liquid phase. The thermoplastic material may generally comprise a polymeric component that is not cross-linked covalently or cross-linked in a manner that the cross-linking bonds open reversibly upon heating to or above a melting temperature range. The polymer material may further comprise a filler, e.g. fibers or particles of material which has no thermoplastic properties or has thermoplastic properties including a melting temperature range which is considerably higher than the melting temperature range of the basic polymer.

Specific embodiments of suitable thermoplastic materials are Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride (PVC), polyethylene, polypropylene, and polystyrene, or copolymers or mixtures of these. In particularly preferred embodiments, the thermoplastic material comprised by the connector element is polypropylene or polyethylene or polystyrene or polyvinyl chloride or polylactic acid based.

Advantageously the thermoplastic material of the protrusions is the same as the thermoplastic material of the link members. Moreover, the protrusions and the link members may consist of the identical thermoplastic material. In an embodiment also the base portion consists of or at least comprises the thermoplastic material.

The thermoplastic material can be reinforced. Advantageously it can e.g. be a fiber reinforced polypropylene. The fibers included can, e.g., be glass or carbon fibers. In an advantageous embodiment, the connector element is monolithically formed. Thereby, it can consist of one single thermoplastic material.

In accordance with the invention, provision of the link members allows for stabilizing the protrusions during the bonding process. In particular, they may prevent that the protrusions get damaged when being pressed to the substrate and mechanically excited. Thus, the link members allow the protrusions to penetrate comparably smoothly into the substrate. This allows to achieve a firm anchoring of the connector element into the substrate. Further, the link members allow to design the protrusions comparably thin which also may result in a more efficient penetration of the protrusions into the substrate. Such comparably thin but anyway stable protrusions are also beneficial for bonding the connector element to a comparably soft substrate.

Further, the link members may serve for guiding and improved alignment of the connector element during the bonding process. Also, the link members may serve for cutting through portions of the substrate material. This may be promoted by at least a part of the link members is equipped with a cutting structure such as a sharp edge.

Since the link members comprise the thermoplastic material configured to liquefy during the bonding process, they may enhance connection of the connector element to the substrate after re-solidification. In particular, this may be achieved due the link members adding connection surface to the connector element. Like this, in embodiments of the invention, the number of protrusions may be reduced without reducing a connection strength achieved, which may also allow to reduce the weight of the connector element. Connector elements of comparably small diameters and comparably long protrusions are feasible since the link members prevent the protrusions from spreading apart or breaking. In general, the protrusions do not need to be too large in their cross section due to this.

In a preferred embodiment, the link members are membrane-like shaped. Such link members are designed as thin walls and may also be referred to as membranes or rib membranes. Such membranes may provide for sufficient stability to the protrusions by a comparably small or thin and non-disturbing structure. For example, the link members can be ten or more times thinner than the protrusions.

Preferably, the protrusions of the connector element have a substantially identical protrusion length and each of the link members connects the at least two neighboring protrusions along at least a quarter of the protrusion length of the protrusions, preferably along at least a third of the protrusion length of the protrusions and more preferably along at least a half of the protrusion length of the protrusions or along at least two third of the protrusion length of the protrusions. Such configuration of the link members allows to sufficiently stabilize the protrusions and at the same time to design the link members comparably thin.

It is however not generally excluded that in specific embodiments the link members exceed the protrusion length. This may be for various reasons such as cutting into the substrate material and thereby increasing, e.g., the accessible surface of open pores for an enhanced bonding or foster a deep anchorage/bonding by being able to insert the connector element further into the substrate.

Preferably, the link members project from the distal surface of the base portion. Like this, the link members can be embodied as one-piece with the base portion, i.e., the link members can pass over into the distal surface of the base portion. Like this, the link members may be strong enough to withstand comparably high shear forces to which the connector element may be exposed. For example, such shear forces may be compensated as the cross section vary over the axial or proximodistal length of the link member. For instance, the cross section of the link member may be larger at the interface with the base portion or its distal surface and smaller at the very distal end where it may form a sharp or cutting edge. Also, the link member may be inclined with respect to the distal surface and/or with respect to the at least two neighboring protrusions. The link member in its width may have different forms in different embodiments. The width of the link members may be the width of the link members between the at least two neighboring protrusions they are connecting. In general, the link member may be adapted to the position, inclination and size of the protrusions. At the interface with the respective protrusion the link member may be thicker than over the remaining width. The link members may be curved in a concave or convex manner.

Preferably, the base portion has a circumference and the protrusion are arranged along the circumference of the base portion. In this context, the circumference may mean the radially outer face of the base portion. In embodiments of disk-like shaped base portions the circumference may include an edge of the base portion. Such edge may be a radially or outwardly extending face. In embodiments of cylinder-like base portions, the circumference can include a mantle area. The protrusions being arranged along the circumference can mean that the protrusions are located in proximity of the circumference at the distal surface. For example, they can be in a circle or line parallel and near to the edge or mantle.

Like this, the base portion can be bonded at or near its edge to the substrate. Thereby, a comparably highly torque resistant connection can be achieved. Also, a wide and solid bonding between connector element and substrate can be achieved as the bonding surface is the largest along the radially outermost edge/circumference of the connector element.

Preferably, the base portion of the connector element comprises a disk section having the distal surface. In particular, the complete base portion can be disk shaped or, more specifically, have the shape of a circular disk. In such embodiments, the protrusion may be arranged in a circle along the circumference of the base portion. In embodiments where the base portion does not have a circular shape the protrusions are arranged in the geometric form of the cross section of the base portion e.g. rectangular cross section of the base plate leads to the arrangements of the protrusions along the rectangular circumference of the base portion.

Preferably, each of the protrusions comprises a groove distally extending along the protrusion. Such grooves in the protrusions may promote melting or liquefying the protrusions. In particular, when the connector element is exposed to mechanical vibration or oscillation during bonding to the substrate the grooves may provide for additional friction surfaces such that the material of the connector element liquefies quicker. Further, the grooves may act as energy directors, directing the energy of the mechanical vibration or oscillation. In such manner the mechanical energy cumulates in specific regions in order to cause the material of the protrusion to liquefy under mechanical excitation quicker. The grooves are arranged on that part of the protrusion, which is to be brought into contact with the substrate material during the bonding process. The protrusions arranged along the circumference of the base portion of the connector element may be provided with grooves as described herein.

Thereby, the grooves preferably extend along essentially a complete protrusion length. Such configuration may render the grooves particularly effective in the sense of directing the mechanical energy. The grooves may reach into the base portion, in the circumference of the base portion i.e. run axially or proximodistally along a part of the mantle area of the connector element. In some embodiments it may also be beneficial to have some portions of the protrusions not provided with the grooves, e.g., a distal third of the axial or proximodistal protrusion length, or only 5-20% of the axial or proximodistal length (distal or proximal or in a middle section of the axial or proximodistal protrusion length arranged between the proximal and distal end of the protrusion). Typically, 50% of the axial or proximodistal protrusion length are provided with grooves in order to achieve the advantageous effects.

Embodiments of connector elements, in which the distally extending grooves are present only on some of the protrusions and not on each of them, are not excluded. Also, in some embodiments it may be advantageous to provide the grooves on protrusions that are not arranged along the circumference of the base portion of the connector element.

Preferably, each of the protrusions has a distal piercing end. Such piercing end can be formed as a tip, a cutting edge or the like. In particular, the piercing end can be configured to pierce the substrate when the connector element is pressed to the substrate. Like this, a firm anchoring of the protrusions into the substrate can be achieved. A further purpose may be the direction of energy i.e. act as energy directors. The piercing ends can be configured to be particularly suitable for the type of substrate involved.

Preferably, the connector element comprises a central dome portion distally extending form the distal surface of the base portion, wherein the central dome portion is surrounded by the protrusions. In some embodiments, particularly depending on the cross section of the base portion, the central dome portion does not have to be aligned centrally in geometric sense. Rather, it can be central with regard to the protrusions, i.e. being surrounded by the protrusions.

The central dome portion may be axially longer that the rest of the protrusions of the connector element. Depending on the design of the central dome portion by being axially longer it may function as a guiding means during the initial phase of the bonding process. However, in some embodiments the central dome portion may also be axially short or have the same axial length as the protrusions.

The central dome portion preferably has distally extending teeth. Such teeth may assist penetration of the dome portion into the substrate when being pressed against the latter. The teeth may each comprise a groove distally extending along the tooth. The grooves of the teeth may also extend along essentially a complete length of the teeth. A purpose of the grooves is the reduction of amount of material and as a result a reduction of weight as well as the creation of energy directors between the grooves. Also, the grooves may contribute to directing energy, e.g., the area not building grooves form projections that may act as energy directors.

Each of the teeth preferably has a distal piercing end. Such piercing end may be embodied as tip, cutting edge or the like. By being equipped with a piercing end, the teeth may efficiently penetrate the substrate.

The central dome portion preferably has a cavity opening at the proximal side of the base portion. Such cavity accessible from the proximal side of the base portion can provide a functionality of the set connector element. For example, such cavity can be a threaded channel or can—in a second step—be provided with a thread by a self-tapping screw. Like this, after the connector element being set and bonded to the substrate, a screw can be connected to the substrate via the connector element. In particular, a self-tapping screw can be used having a cutting thread for cutting in the thermoplastic material. In some embodiments, the cavity is closed or plugged at its distal end e.g. by the teeth with or without distal piercing ends. This is to prevent, that liquefied material fills the cavity during the bonding process or damages the cavity. The cavity may also be a female part of a, e.g., a clamping or snapping connection.

The central dome portion preferably is configured such that the cavity withstands bonding of the connector element to the substrate. This may be achieved by providing a side wall of the central dome portion that has a thickness larger than a thickness of the protrusions. Another way of achieving this effect is to design the teeth and grooves in a way that provides for a certain stability during the bonding process so the central dome portion does not collapse by the effect of mechanical excitation the connector element is exposed to during the bonding process. An example are radial projections that liquefy first during the bonding process.

Preferably, the distal surface of the base portion has a flat section. In particular, the flat section can be embodied by not comprising any protrusions and eventually teeth or similar structures. Such flat section can abut the proximal surface of the substrate which allows for efficiently compressing the substrate. In addition to that, the flat section can serve as stop face in the bonding process. The flat section generally is flat, plane or even but it may also comprise grooves or other structures or may be of a slightly uneven shape.

The flat section preferably is a predominant part of the distal surface of the base portion. The protrusions including the link members and—if present—the central dome portion cover the minor part of the distal surface of the base portion. Like this, an efficient compression of the substrate can be achieved which may be particularly beneficial if comparably soft substrates are involved.

Preferably, the base portion is equipped with a proximal coupling structure. Such coupling structure may interact with a corresponding structure of a tool, e.g., a sonotrode. For example, the coupling structure can be embodied as male or female part of a coupling. By means of the coupling structure, the connector element can efficiently be held or operated by the tool.

Preferably, the cross-sections of the protrusions decrease in a distal direction. The cross-sections of the protrusion may be the same for all protrusions or vary. Such decreasing cross-sections may allow for tapering the protrusions such that they can efficiently penetrate the substrate.

Preferably, the protrusions are arranged near a circumferential edge of the base body. The circumferential edge may basically equal the mantle area of the base portion. Such arrangement allows for bonding the base portion at or near its edge to the substrate. Like this a wide and solid bonding between connector element and substrate can be achieved as the bonding surface is the largest along the radially outermost edge/circumference of the connector element. In particular, in embodiments having comparably large base portions such arrangement may be beneficial.

Thereby, at least some of the protrusions preferably have an outer side associated to the circumferential edge of the base body and the outer sides of the at least some of the protrusions preferably are inclined. If the base portion is essentially circular disk shaped, the outer sides typically are the radial end sides or faces of the protrusions. The radial outer sides of the protrusion may be the axial continuation of the mantle area of the base portion.

Preferably, the base portion has a proximal flange portion and a distal cylinder portion. The proximal flange portion typically is of a larger cross section than the distal cylinder portion. The shape of the cross section may vary, e.g., the proximal flange portion is round and the cylinder portion has a rectangular cross section or both, the proximal flange portion and the cylinder portion are of a rectangular or even other cross section. Such flange portion allows for providing a comparably large proximal side. The flange portion may act as a stop face during the bonding process.

The connection between the proximal flange portion and the cylinder portion may be continuous, i.e., the cross section of the proximal flange portion decreases in distal direction until it is of the same diameter as the cylinder portion. This is also possible for embodiments in which the shape of the cross section of the proximal flange portion and the cylinder portion are different. This may allow for the connector element to be inserted and bond to substrate in a smooth way.

Further, the base portion preferably comprises ribs connecting the flange portion and the cylinder portion. Such ribs may stabilize the flange portion relative to the cylinder portion. Thereby, the ribs preferably extend from a distal end of the flange portion to an outer surface of the cylinder portion. The ribs arranged on the distal surface of the proximal flange portion may also act as energy directors in order to provide for a proper bonding of the flange portion to the or into the proximal surface of the substrate material.

In another aspect, the invention is a method of bonding a connector element as described above to a compressible substrate having a proximal surface. The method may also be referred to as bonding process.

The method comprises the steps of: (i) arranging the connector element at the substrate such that the protrusions of the connector element extend towards the proximal surface of the substrate; (ii) applying a pressing force and a mechanical excitation such that the protrusions of the connector element penetrate the substrate and such that at least a portion of the thermoplastic material of the protrusions and the thermoplastic material of the link members liquefy; and (iii) stopping the mechanical excitation such that the thermoplastic material of the protrusions and the thermoplastic material of the link members re-solidify.

The pressing force and the mechanical excitation can be applied to the connector element and/or the substrate. The pressing and the mechanical excitation are advantageously applied by at least one tool. In a preferred embodiment of the invention the at least one tool is a sonotrode that applies the pressing force as well as the mechanical excitation to the connector element and/or the compressible substrate. As an alternative the pressing force may be applied by a further tool arranged next to the sonotrode or below (distally) of the substrate material pressing in proximal direction towards the sonotrode.

Mechanical excitation in a preferred embodiment is mechanical vibration or oscillation having a preferred frequency between 2 and 200 kHz. Even more preferably the ultrasonic vibration has a frequency between 10 and 100 kHz, or between 20 and 40 kHz. A vibration energy may be 0.2 to 20 W per square millimeter of active surface. The vibrating tool or sonotrode is, e.g., designed such that its contact face oscillates predominantly in the direction of the tool axis (longitudinal vibration) and with an amplitude of between 1 and 100 μm, preferably around 50 to 80 μm. Such preferred vibrations may be produced by ultrasonic devices as, e.g., known from ultrasonic welding.

In an advantageous arrangement, the substrate is held and the connector element is pressed to the substrate and mechanically excited. The mechanical excitation can, as mentioned above, particularly comprise oscillation or vibration. Thereby, the oscillation or vibration may be provided along the protrusions or at an angle thereto. The at least a portion of the thermoplastic material of the protrusions and the thermoplastic material of the link members can be 5% or even less, or also more. Depending on the embodiment of the connector element the link members may in the method step of applying a pressing force and a mechanical excitation penetrate the substrate.

In the context of the invention the term "compressible substrate" refers to a substrate that is capable of changing its compressive strength by the application of pressure. Compressive strength is referred to the maximal force per square millimeter generated by an area before said area is displaced, this means in this context before the compressible substrate is compressed and the compressive strength is increased. The compressive strength may correspond to the stress as measured in a stress-strain experiment, for example.

The compressible substrate material preferably is a foam-like material such as EPP, EPS, XPS, XPP, PA, PET, PPE, PE foam, PVC foam PLA foam, and foam of polymer blend of any of these materials. The thermoplastic material of a connector element suitable for the method according to the invention needs to be compatible (weldable) with the material of the compressible substrate. E.g. a substrate comprising EPP works best with a connector element comprising a PP based material, a substrate comprising EPS works best with a connector element comprising a polystyrene based material, a substrate comprising XPS works best with a connector element comprising a polystyrene based material, a PE foam acting as substrate works best with a connector element comprising a PE based material, a PVC foam acting as substrate works best with a connector element comprising a polyvinyl chloride based material and a PLA foam acting as substrate works best with a connector element comprising polylactic acid based material.

In a preferred embodiment the connector element compresses the substrate in a portion of the substrate where the connector element is arranged. Such compression allows for generating a critical density and/or critical compressive strength required to liquefy the thermoplastic material by the mechanical excitation.

Preferably, when applying the pressing force to the connector element, a density of the substrate in the portion of the substrate where the connector element is arranged is increased until it is sufficiently high to allow the protrusions to penetrate the substrate and the thermoplastic material of the protrusions and the thermoplastic material of the link members to liquefy.

Preferably, the method comprises a step of stopping the application of the pressing force only after the thermoplastic material of the protrusions and the thermoplastic material of the link members is re-solidified. This can be important since only after re-solidification of the thermoplastic material the achieved bonding can overcome the spring back effect of the compressible material resulting from releasing the pressure on the compressible material. Since the aim may be to achieve a nearly flush connection i.e. the proximal surface of the connector element is flush with the proximal surface of the substrate material it is important that the connector element is not pushed into a proximal direction after the bonding process.

The bonding process can be carried out in an automated manner.

BRIEF DESCRIPTION OF THE DRAWINGS

The connector element according to the invention and the method according to the invention are described in more detail hereinbelow by way of exemplary embodiments and with reference to the attached drawings.

DETAILED DESCRIPTION

In the following description of the embodiments as well as in the above description of the invention the terms "proximal" and "distal" are used to refer to directions and locations, namely "proximal" is the side of the bond from which an operator or machine applies the mechanical vibrations, whereas distal is the opposite side. This, is distal relates to a direction and side of the connector element directed to the substrate when being bonded to the substrate. Further, a difference is made between axial and proximodistal since in some embodiments the e.g. protrusion or the link member are not axially aligned but are inclined with respect to the base portion.

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

Figure 1:
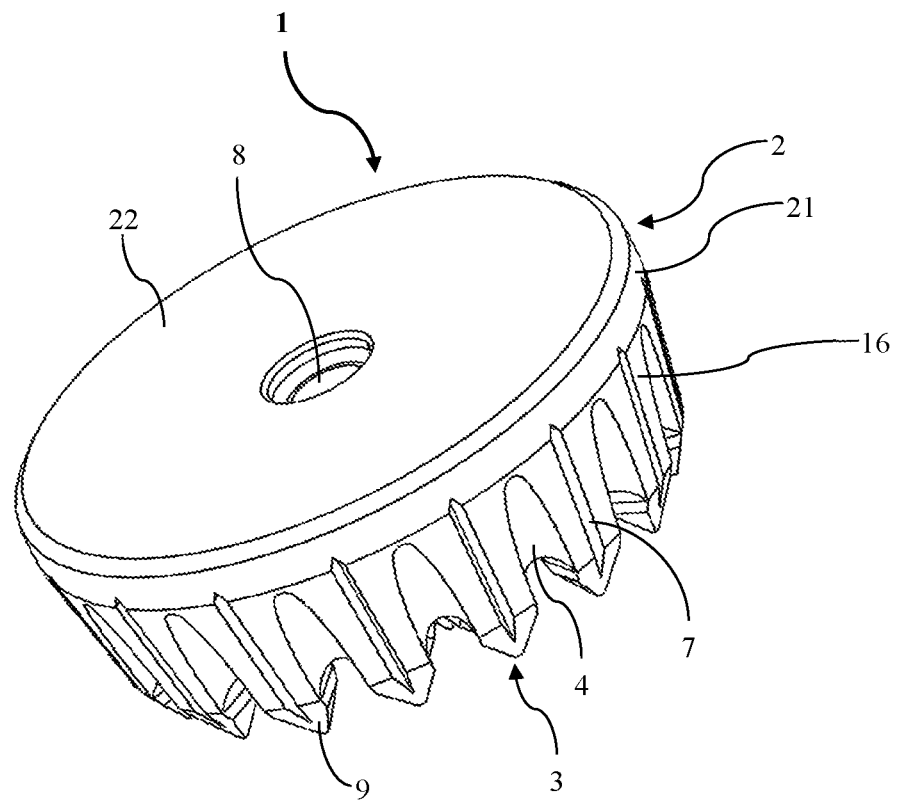
FIG. 1 shows a perspective view on a proximal side of a first embodiment of a connector element according to the invention.
Figure 2:
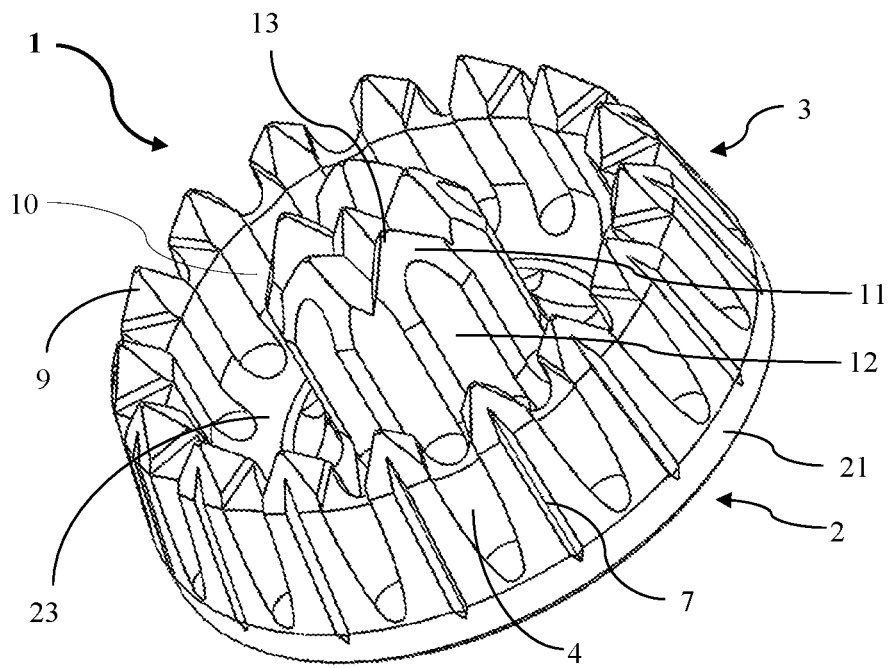
FIG. 2 shows a perspective view on a distal side of the connector element of FIG. 1.
Figure 3:
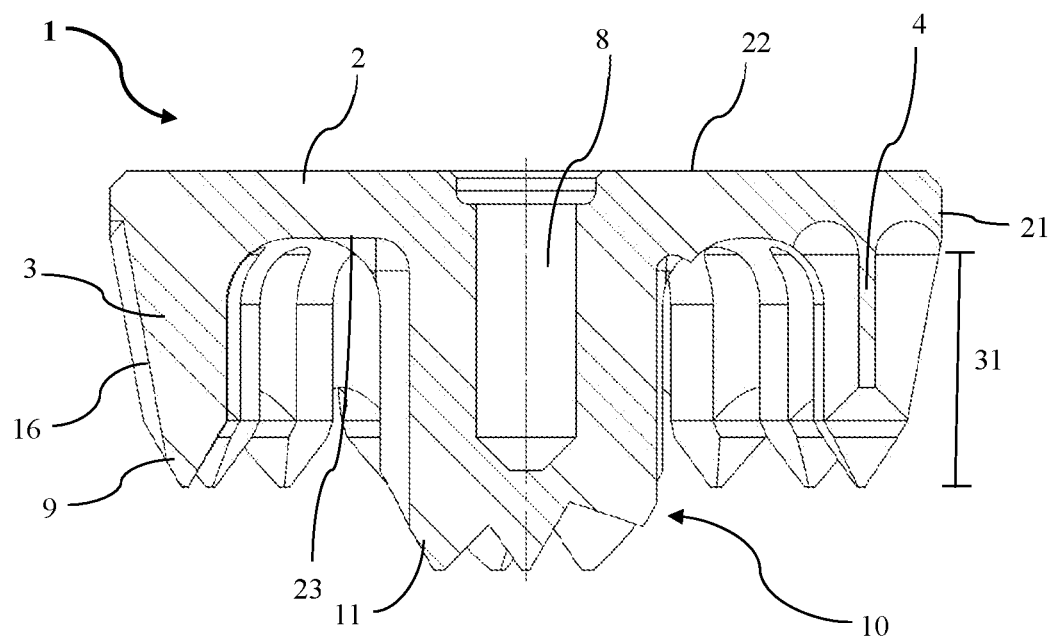
FIG. 3 shows a cross sectional view of the connector element of FIG. 1.

FIGS. 1 to 3 show a first exemplary embodiment of a connector element 1 according to the invention made of a thermoplastic material. As can be seen in FIG. 1 the connector element 1 has a base portion 2, a plurality of protrusions 3 and a plurality of link members 4. Between each two neighbouring protrusions 3 one of the link members 4 is arranged such that each two neighbouring protrusions 3 are interconnected by one of the link members 4.

The base portion 2 is essentially disk-shaped and has a radial edge 21 forming its circumference and a flat proximal surface 22. Centrally, there is an opening of a cavity 8 embodied in the proximal surface 22 of the base portion 2. A cross-section of the base portion 2 is circular.

The protrusions 3 are provided with axial grooves 7 at their radially outer faces 16. In the depicted first embodiment the length of the grooves 7 corresponds to an essentially full protrusion length 31 (see FIG. 3). The grooves 7 extend into a distal portion of the base portion 2, but do not fully reach distal ends 9 of the protrusion 3. The outer surfaces 16 of the protrusions 3 are associated to the circumferential edge 21 of the base portion 2 and are slightly axially inclined as can be best seen in FIG. 3. At their very distal ends 9, the protrusions are equipped with a piercing tip.

The link members 4 are embodied as membranes spanned between the associated projections 3. As can be seen in FIG. 3, they extend from a distal surface 23 of the base portion 2 in a distal direction. Thereby, they connect the associated two protrusions 3 along about two third of the protrusion length 31. The link members are aligned normal with respect to the distal surface 6 of the base portion 3 although the outer side 16 of the protrusions 3 are inclined. Further the link members 4 are round at their distal end. Along their width the link members do vary i.e. the parts closer to the protrusion are thicker that the part in the middle. The part in the middle is membrane-like shaped. This is to guarantee maximal stabilization of the protrusions 3.

In the center of the proximal side 5 of the base portion 2 the cavity 8 opening of the central dome portion 10 is arranged. The central dome portion 10 is shown on FIG. 2 in greater detail.

FIG. 2 the connector element 1 is shown from below or from a distal perspective. The protrusions 3 are arranged along the circumference or edge 21 of the base portion 2 i.e. at the outmost radial area of the base portion 2. Thereby, the protrusions 3 are positioned along a line in the form of a circle. In the center of the distal surface 23 of the base portion 2 a central dome portion 10 is formed. The dome portion 10 is surrounded by the protrusions 3. Between the central dome portion 10 and the protrusions 3 a flat portion of the distal surface 23 of the base portion 2 is visible. The flat portion in the depicted embodiment is not plane but shows some minor unevenness that is, e.g., the result of production such as injection molding, milling or the like.

The central dome portion 10 hast six teeth 11 that extend distally and do have axial grooves 12. At their very distal end the teeth 11 are equipped with distal piercing ends 13. As can be seen in FIG. 3, the central dome portion 10 provides a cavity 8 that opens towards the proximal surface 22 of the base portion 2. The central dome portion 10 is axially longer than the protrusions 3 and the teeth 11 have a larger cross section than the protrusions 3. Like this, the central dome portion 10 has a higher solidity than the protrusions 3 which allows to prevent the cavity 8 from being destroyed or impaired during the bonding process.

As can be best seen in FIG. 3, the outer faces 16 of the protrusions 3 are inclined with regard to an axis of the connector element 1. The circumferential edge 21 of the base portion 2 is not inclined but axially extends. The cavity 8 provides for a screw recess accessible through the opening in the proximal surface 22 of the base portion 2.

For the description of further embodiments below, the following applies: To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 4:
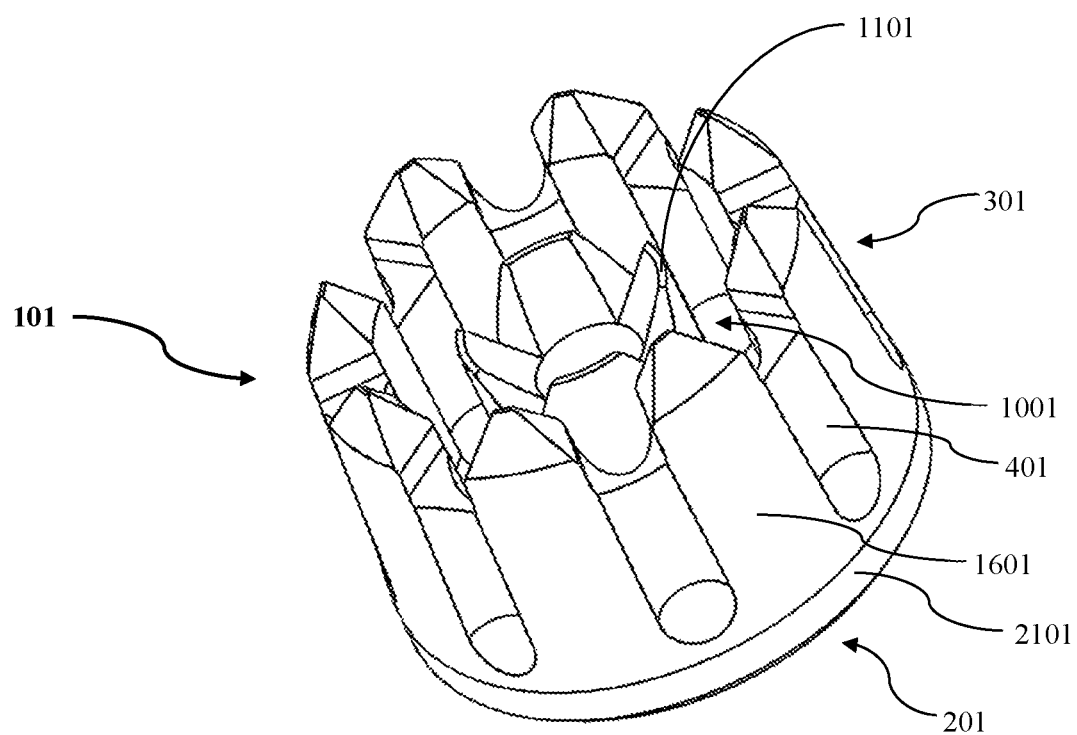
FIG. 4 shows a perspective view on a distal side of a second embodiment of a connector element according to the invention.

FIG. 4 shows a second embodiment of a connector element 101 according to the invention. The connector element 101 has a circular disk shaped base portion 201, a plurality of protrusions 301 and membrane like link members 401 each interconnecting two neighbouring protrusions 301. The second connector element 101 is similarly embodied as the first connector element 1 but has a smaller cross section and, consequently, fewer protrusions 301. A central dome portion 1001 has teeth 1101 which do not extend axially over the protrusions 301 it is surrounded by. Outer sides 1601 of the protrusions 301 as well as a circumferential edge 2101 of the base portion 201 are inclined and do form a—so to say—outer continuing line in order for the connector element 101 to be set/bond to the substrate in a smooth way with the result of a flush connection point.

Figure 5:
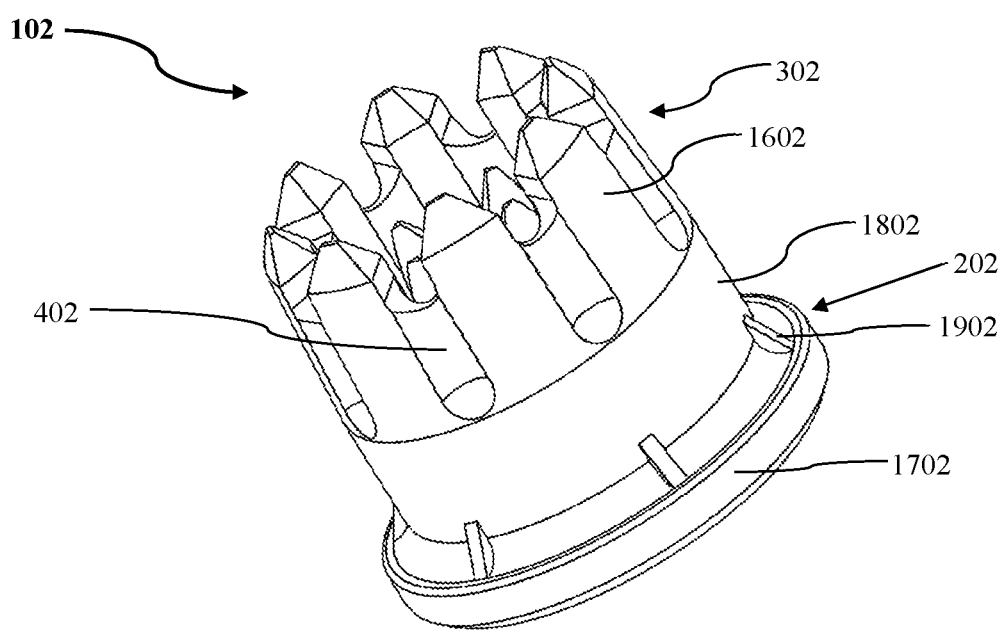
FIG. 5 shows a perspective view on a distal side of a third embodiment of a connector element according to the invention.

FIG. 5 shows a third embodiment of a connector element 102 according to the invention. The connector element 102 has a base portion 202, a plurality of protrusions 302 and membrane like link members 402 each interconnecting two neighbouring protrusions 302. The third connector element 102 is similarly embodied as the first connector element 1 but has a smaller cross section of similar dimension as the second connector element 101. Moreover, the third connector element 102 has the same number of protrusions 302 as the second connector element 101 and fewer protrusions 302 as the first connector element 1. However, in contrast to the base portions 2, 201 of the first and second embodiments, the base portion 202 has a proximal flange portion 1702 and a distal cylinder portion 1802. The two portions are connected by a plurality of ribs 1902. The ribs 1902 extend from a proximal end of the flange portion 1702 to an outer surface of the cylinder portion 1802.

Figure 6:
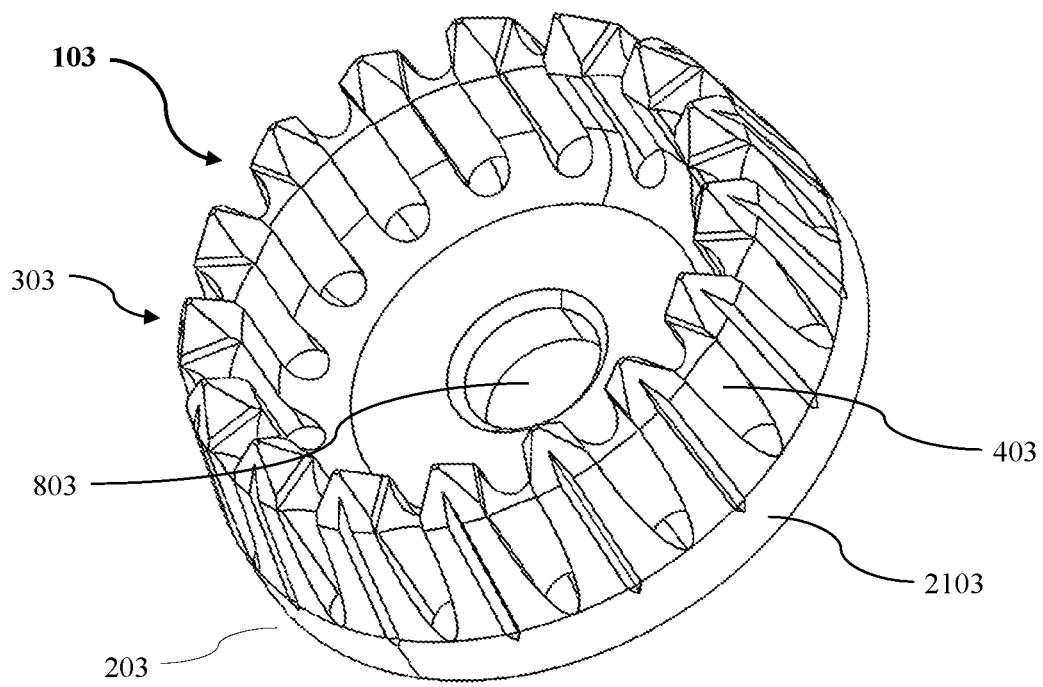
FIG. 6 shows a fourth embodiment of a connector element according to the invention.

In FIG. 6 a fourth embodiment of a connector element 103 according to the invention is shown. The connector element 103 has a circular disk shaped base portion 203 with a circumferential edge 2103, a plurality of protrusions 303 and membrane like link members 403 each interconnecting two neighbouring protrusions 303. The fourth connector element 103 is similarly embodied as the first connector element 1. However, in contrast to the first connector element 1, the fourth connector element 103 does not have a dome portion but a central bore 803 extending through the base portion 203.

Figure 7:
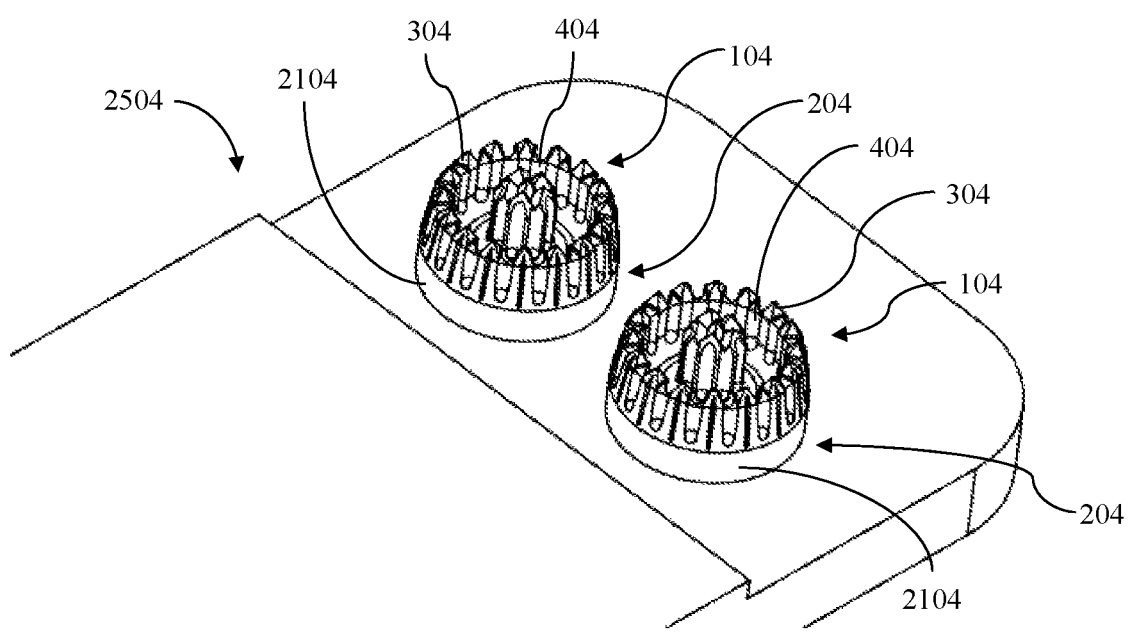
FIG. 7 shows a fifth embodiment of a connector element according to the invention.

FIG. 7 shows a fifth embodiment of a connector element 104. The connector element 104 has a base portion 204 with a circumferential edge 2104, a plurality of distally extending protrusions 304 and link members 404 each interconnecting two neighbouring protrusions 304. The fifth connector element 104 is similarly embodied as the first connector element 1. However, it is integrated together with an identical further connector element 104 in a functional part 2504, i. e. a part having a function other or in addition to the function of bonding to a substrate. The functional part 2504 may for example be a hinge or a reinforcement part but, in the context of the invention, is not limited to these examples. Basically, it can be any functional part used in, e.g., transportation industries (such as automotive industry, packaging, aviation, navigation or aerospace) to be bonded to a substrate. The integration of the connector element 104 into the functional part 2505 or a similar part is advantageous because it simplifies the bonding process and reduces the number of parts used and therefore cuts down the number of processing steps.

In other embodiments, any of the second to fourth connector elements 101, 102, 103 or a similar connector element may be integrated in the functional part 2504 or a similar functional part.

Figure 8:
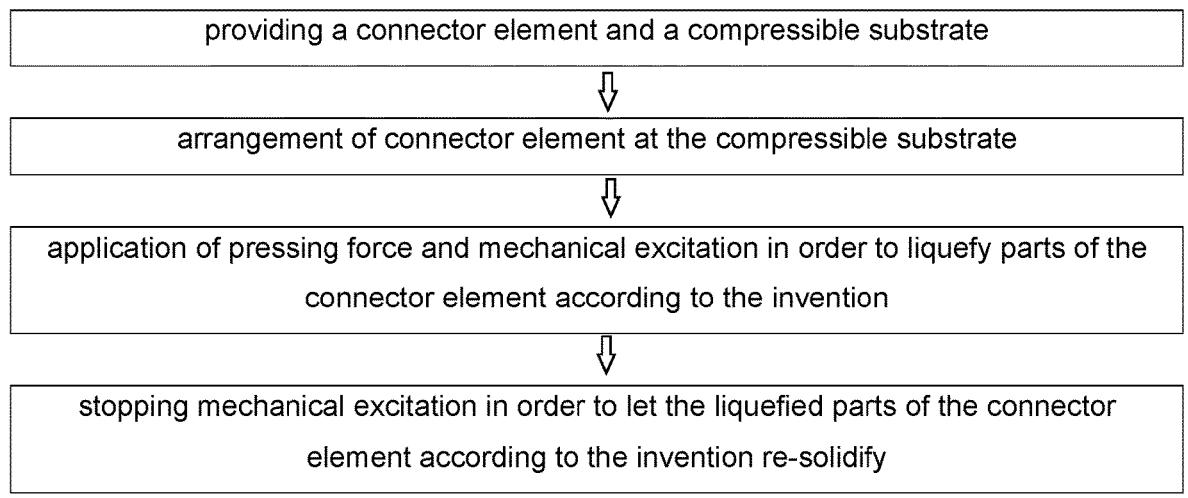
FIG. 8 a flow scheme of an embodiment of the method according to the invention.

In the diagram shown in FIG. 8 the steps of an embodiment of the method according to the invention are shown. The first step is to provide a connector element 1, e.g., as described in connection with FIGS. 1 to 3 in a solid state and a compressible substrate (not shown in the figures).

In the second step the connector element 1 and the substrate are arranged relative to each other. This step can be carried out manually, semi-automated or automated. The connector element 1 is arranged such that the protrusions 3 of the connector element are brought into contact with the proximal surface of the substrate. In the context of the invention the protrusions 3 of the connector element 1 do not necessarily have to touch the proximal surface of the substrate but should be aligned in a respective direction at the vicinity of the compressible substrate material.

A third step relates to the application of a pressure force and mechanical excitation. In this step the protrusions 3 of the connector element 1 penetrate the substrate, particularly the proximal surface of the substrate such, that at least a portion of the thermoplastic material of the protrusion 3 and the thermoplastic material of the link members 4 are liquefied. Applying the pressing force may comprise compressing the substrate in a region where the connector element 1 has been arranged in the first step of the method. By doing so the density of the substrate in this region is increasing until it is sufficiently high to allow the protrusions to penetrate the substrate and to liquefy the thermoplastic material of the protrusions and the thermoplastic material of the link members at least partially.

A fourth step of the method provides for stopping the mechanical excitation so that the liquefied thermoplastic material of the protrusions 3 as well as of the link members 4 of the connector element will re-solidify and the pressing force can be stopped to be applied as well.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

What is claimed is:

1. A connector element for being bonded to a substrate by pressing the connector element and the substrate together and mechanically exciting the connector element and the substrate relative to each other when being pressed together, comprising:
   a base portion having a distal surface;
   a plurality of protrusions distally extending from the distal surface of the base portion, wherein the plurality of protrusions comprise a thermoplastic material configured to liquefy when the connector element is pressed to the substrate and mechanically excited; and
   at least a part of link members being equipped with a sharp edge that comprises a thermoplastic material configured to liquefy when the connector element is pressed to the substrate and mechanically excited, wherein each link member connects two neighboring protrusions of the plurality of protrusions.

2. The connector element of claim 1, wherein the link members are designed as thin walls.

3. The connector element of claim 1, wherein the plurality of protrusions have a substantially identical protrusion length and wherein each of the link members connects the two neighboring protrusions along at least a quarter of the protrusion length of the respective protrusions.

4. The connector element of claim 1, wherein the link members project from the distal surface of the base portion.

5. The connector element of claim 1, wherein the base portion has a circumference and wherein the plurality of protrusions are arranged along the circumference of the base portion.

6. The connector element of claim 1, wherein the base portion comprises a disk section having the distal surface.

7. The connector element of claim 1, wherein each of the plurality of protrusions comprises a groove distally extending along the protrusion.

8. The connector element of claim 7, wherein the groove extends along essentially a complete protrusion length.

9. The connector element of claim 1, wherein each of the plurality of protrusions has a distal piercing end.

10. The connector element of claim 1, comprising a central dome portion distally extending from the distal surface of the base portion, wherein the central dome portion is surrounded by the plurality of protrusions.

11. The connector element of claim 10, wherein the central dome portion has teeth distally extending.

12. The connector element of claim 11, wherein each tooth of the teeth comprises a groove distally extending along the tooth.

13. The connector element of claim 11, wherein each of the teeth has a distal piercing end.

14. The connector element of claim 10, wherein the central dome portion has a cavity that opens at a proximal side of the base portion.

15. The connector element of claim 14, wherein the central dome portion is configured such that the cavity withstands bonding of the connector element to the substrate.

16. The connector element of claim 14, wherein a side wall of the central dome portion has a thickness larger than a thickness of the plurality of protrusions.

17. The connector element of claim 10, wherein the plurality of protrusions distally project beyond the central dome portion.

18. The connector element of claim 1, wherein the distal surface of the base portion has a flat section.

19. The connector element of claim 18, wherein the flat section is a predominant part of the distal surface of the base portion.

20. The connector element of claim 1, wherein the base portion is equipped with a proximal coupling structure.

21. The connector element of claim 1, wherein cross-sections of the plurality of protrusions decrease in a distal direction.

22. The connector element of claim 1, wherein at least some of the plurality of protrusions are arranged near a circumferential edge of the base portion.

23. The connector element of claim 22, wherein each of the at least some of the plurality of protrusions has an outer side associated to the circumferential edge of the base portion and the outer sides of the at least some of the plurality of protrusions are inclined.

24. The connector element of claim 1, wherein the base portion has a proximal flange portion and a distal cylinder portion.

25. The connector element of claim 24, comprising ribs connecting the proximal flange portion and the distal cylinder portion.

26. The connector element of claim 25, wherein the ribs extend from a distal end of the proximal flange portion to an outer surface of the distal cylinder portion.

27. The connector element of claim 1, wherein the plurality of protrusions have a substantially identical protrusion length and wherein each of the link members connects the two neighboring protrusions along at least a third of the protrusion length of the respective protrusions.

28. The connector element of claim 1, wherein the plurality of protrusions have a substantially identical protrusion length and wherein each of the link members connects the two neighboring protrusions along at least a half of the protrusion length of the respective protrusions.

29. The connector element of claim 1, wherein the plurality of protrusions have a substantially identical protrusion length and wherein each of the link members connects the two neighboring protrusions along at least two thirds of the protrusion length of the respective protrusions.

30. A method of bonding a connector element of claim 1 to a compressible substrate having a proximal surface, comprising:
   arranging the connector element at the substrate such that the plurality of protrusions of the connector element extend towards the proximal surface of the substrate, applying a pressing force and a mechanical excitation such that the plurality of protrusions of the connector element penetrate the substrate and such that at least a portion of the thermoplastic material of the plurality of protrusions and the thermoplastic material of the link members liquefy, and stopping the mechanical excitation such that the thermoplastic material of the plurality of protrusions and the thermoplastic material of the link members re-solidify.

31. The method of claim 30, wherein applying the pressing force to the connector element compresses the substrate in a portion of the substrate where the connector element is arranged.

32. The method of claim 30, wherein when applying the pressing force to the connector element a density of the substrate in a portion of the substrate where the connector element is arranged is increased until it is sufficiently high to allow the plurality of protrusions to penetrate the substrate and to allow the thermoplastic material of the plurality of protrusions and the thermoplastic material of the link members to liquefy.

33. The method of claim 30, comprising stopping application of the pressing force after the thermoplastic material of the plurality of protrusions and the thermoplastic material of the link members re-solidify.

34. A connector element for being bonded to a substrate by pressing the connector element and the substrate together and mechanically exciting the connector element and the substrate relative to each other when being pressed together, comprising:

a base portion having a distal surface;

a plurality of protrusions distally extending from the distal surface of the base portion, wherein the plurality of protrusions comprise a thermoplastic material configured to liquefy when the connector element is pressed to the substrate and mechanically excited;

link members comprising a thermoplastic material configured to liquefy when the connector element is pressed to the substrate and mechanically excited, wherein each link member connects two neighboring protrusions of the plurality of protrusions; and a central dome distally extending from the distal surface of the base portion, wherein the central dome portion is surrounded by the plurality of protrusions.

* * * * *